Aug. 12, 1930.  A. J. COBHAM  1,773,029
FLOATING STATION FOR AIRCRAFT
Filed Dec. 23, 1929  3 Sheets-Sheet 3

Patented Aug. 12, 1930

1,773,029

UNITED STATES PATENT OFFICE

ALAN JOHN COBHAM, OF LONDON, ENGLAND, ASSIGNOR TO ALAN COBHAM AVIATION LIMITED, OF LONDON, ENGLAND

FLOATING STATION FOR AIRCRAFT

Application filed December 23, 1929, Serial No. 416,022, and in Great Britain December 7, 1928.

This invention relates to floating stations for mooring flying boats and other aircraft which descend on and take off from water, said stations being adapted to be anchored in sheltered waters where such flying boats and other aircraft may alight on the water near such stations and may be held secure to such stations while they are refilled and reconditioned as may be required.

The object of the present invention is to provide, for mooring flying boats and other aircraft which descend on and take off from water, a station which will be stable in its character; which will be comparatively stationary and will not swing around with changes of wind so as to allow such aircraft to descend safely on to the water close to said station and to be able to approach said station from any direction; and which will have no obstructions that would be liable to injure the aircraft or create inconveniences when the aircraft is moored alongside such station.

According to this invention a floating station for mooring flying boats and other aircraft adapted to descend on and take off from water, comprises, a conical buoyant vessel adapted to float with its apex arranged downwardly and with its circular surface upwardly, means whereby said vessel can be moored from the conical side of said vessel at a point intermediate its apex and the circular surface and a deck extending across the circular surface of said vessel from which deck the aircraft may be handled and to which it may be moored.

The deck is preferably so mounted that it is turnable to permit the aircraft to swing with change of wind and current without turning the conical vessel.

The means for mooring the floating station preferably consists of a hawse pipe communicating between the conical side surface of the vessel at a point intermediate its apex and the circular surface and an aperture in the deck through which the mooring cable or chain (hereinafter referred to simply as "mooring cable," for convenience) is passed, the arrangement being such that the cable is prevented from fouling the aircraft while being capable of being manipulated from the deck. The position of the mouth of the hawse pipe in the conical side surface of the vessel is determined by the strength of the current for which the station is designed.

The vessel may be provided with a central hollow trunk on its circular surface within which the mooring hawse pipe and union pipes for fuel tanks mounted in said vessel are accommodated, the deck being mounted to turn about said central hollow trunk.

Referring to the drawings:—

Fig. 4 is a sectional elevation on the line IV—IV in Fig. 3.

Fig. 5 is a sectional elevation on the line V—V in Fig. 3.

Figure 1:
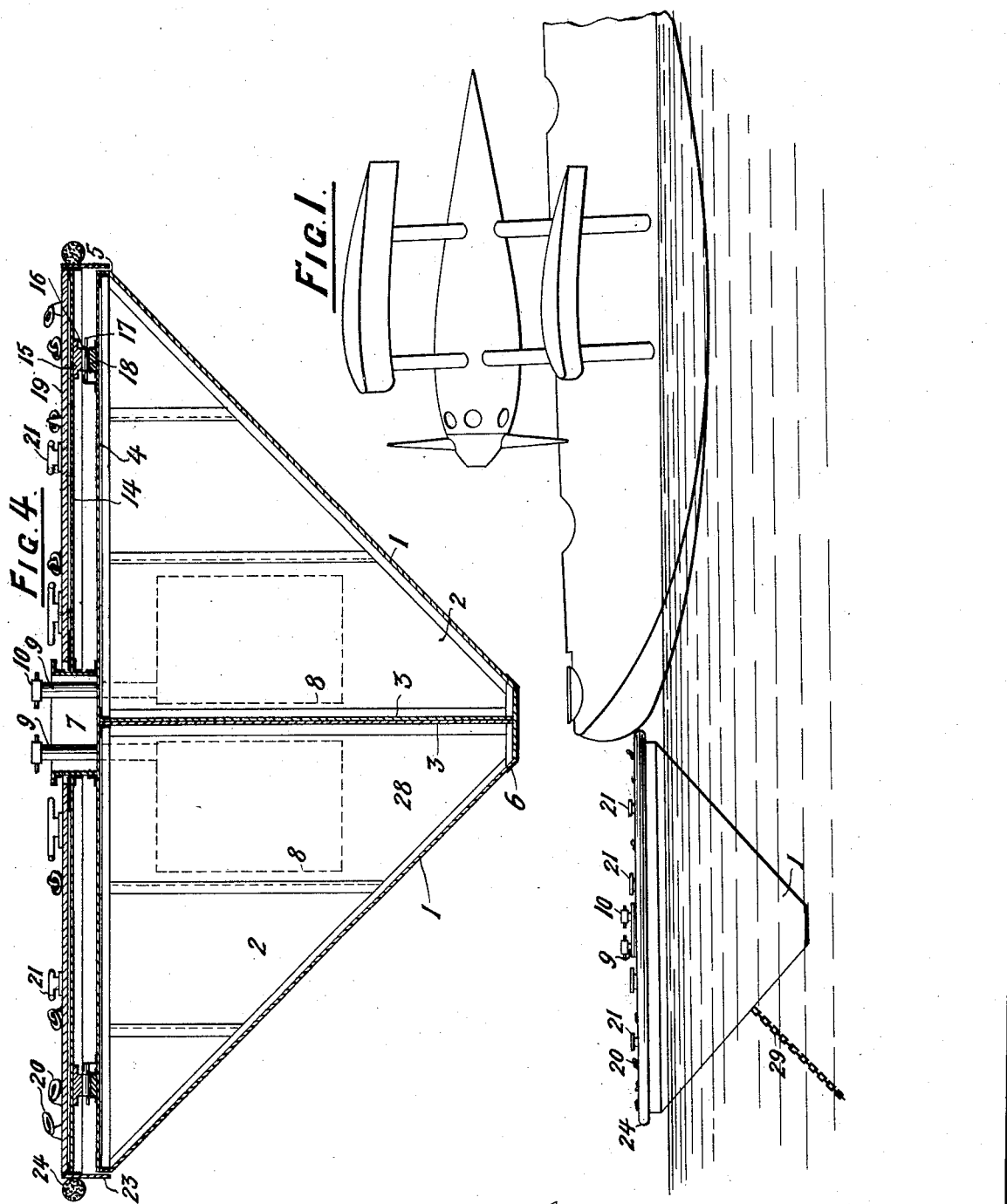
Fig. 1 illustrates the floating station and shows a flying boat moored in a position with its bow on to the floating station.

As shown in the drawings the station consists of a conical vessel, which for convenience in transit is made up in four parts each having a conical outside wall 1, bulkhead walls 2 and 3 and a deck 4, each part is of quadrantal form in plan with the bulkhead walls 2 and 3 at right angles to each other and to the deck 4. Between the conical side portion and the deck a small cylindrical portion 5 is provided. These four conical parts are nested together and are connected at their apices by a bottom plate 6 forming the apex of the vessel and at the top by the trunk member 7 so as to form a circular upper surface constituting the deck of the vessel.

The conical parts are hollow and three of them each contain a fuel tank 8 having a union pipe 9 passing upwardly from it through the trunk 7 and having the union 10 at its upper end. The remaining conical part is formed with a hawse pipe 11 extending through it from an aperture 12 in the deck portion 4 thereof to an outboard mouth 13 in the conical wall 1 of this part about midway between the apex or bottom of the cone and the deck. As previously stated the position of the outboard mouth of this hawse pipe will be determined by the strength of the current for which the station is designed, but will always be intermediate the apex and the deck.

Turnably mounted on the trunk 7 is a platform 14 extending above and covering the whole of the deck 4. This platform 14 is provided adjacent its outer edges with a bearing ring 15 which bears on rollers 16 mounted in a carrier 17 and resting upon the supporting ring 18 on the deck 4 in order that the platform may turn easily on the trunk 7 serving as a hub.

The platform 14 is provided with a wooden upper surface 19 which in turn carries on its upper side, and spaced around the whole of the platform near the periphery thereof, ring-bolts 20 and mooring cleats 21. The platform is provided with a skirt portion 23 fixed around the periphery thereof and depending downwardly around the cylindrical portion 5 of the conical parts. On the exterior of this skirt portion and extending around the whole of the platform is fixed a soft fender 24.

The platform is provided with a manhole 25 normally covered by a plate 26 which can be brought into position opposite similar manholes 27 in each of the conical parts, so as to provide for entrance to said parts for inspection and repair. Moreover, a space 28 is provided in the base of each of the conical parts for ballast.

Figure 2:
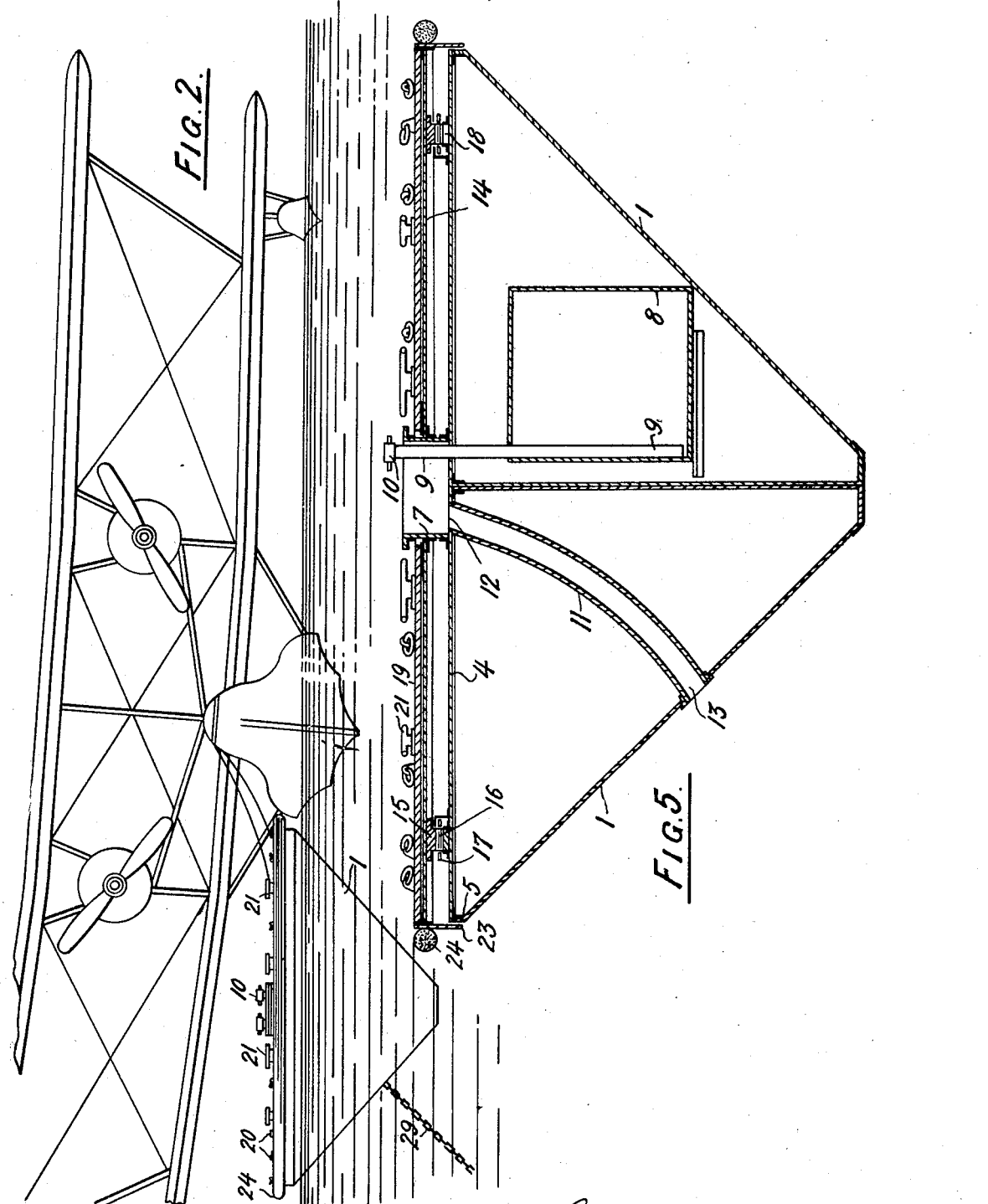
Fig. 2 is a similar view to Fig. 1, but showing the flying boat moored broadside on to the floating station.
Figure 3:
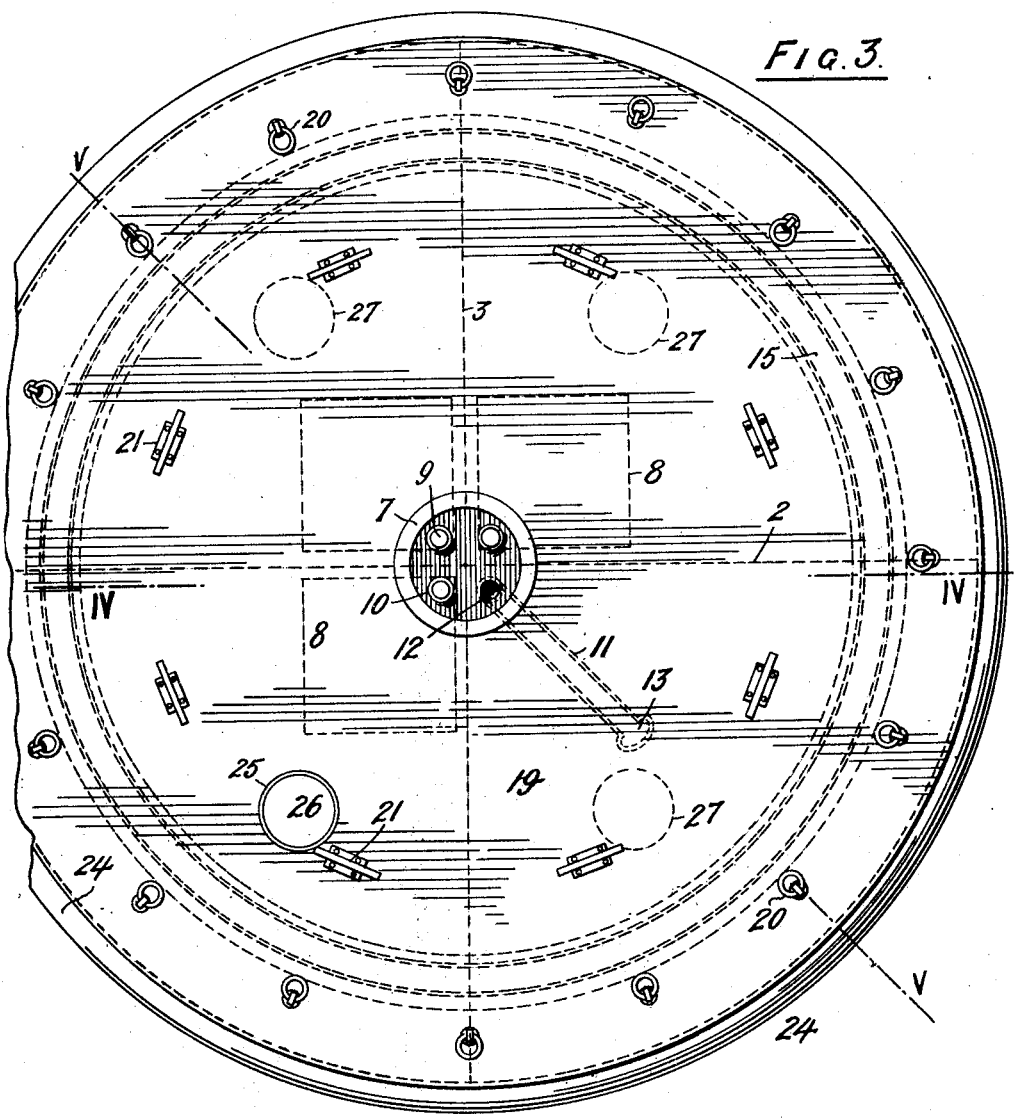
Fig. 3 is a plan view of the floating station drawn to an enlarged scale.

In use the station is moored by a chain or cable 29, as shown in Figs. 1 and 2. The arrangement is such that by riding the tide or current of the water the vessel can maintain its position in relation to said tide or current and thus be held comparatively stationary so that the pilot can cause the flying boat to approach any part of the station against the direction of the wind and moor the boat thereto, after which the flying boat will automatically swing round and take up its natural position relative to both wind and current as permitted by the turnable platform and moreover the boat can swing naturally with changes in the direction of the wind without affecting the position of the vessel itself. The boat may be moored either bow on to the station as shown in Fig. 1, or broadside on to the station as shown in Fig. 2.

A brake or clamping device may be provided on the turnable platform which can be adjusted to stop the turning of this platform or merely to retard its turning movement.

What I claim as my invention and desire to secure by Letters Patent is:—

1. A floating station for mooring flying boats and other aircraft adapted to descend on and take off from water, comprising, a conical buoyant vessel adapted to float with its apex arranged downwardly and with its circular surface upwardly, means whereby said vessel can be moored from the conical side of said vessel at a point intermediate its apex and the circular surface, and a deck extending across the circular surface of said vessel, from which deck the aircraft may be handled and to which it may be moored.

2. A floating station for mooring flying boats and other aircraft adapted to descend on and take off from water, comprising, a conical buoyant vessel adapted to float with its apex arranged downwardly and with its circular surface upwardly, means whereby said vessel can be moored from the conical side of said vessel at a point intermediate its apex and the circular surface, and a turnable deck extending across the circular surface of said vessel, from which deck the aircraft may be handled and to which it may be moored, whereby the aircraft can swing with change of wind and current without turning the conical vessel.

3. A floating station for mooring flying boats and other aircraft adapted to descend on and take off from water, comprising, a conical buoyant vessel adapted to float with its apex arranged downwardly and with its circular surface upwardly, a deck extending across the circular surface of said vessel, from which deck the aircraft may be handled and to which it may be moored, and a hawse pipe extending from the conical side of said vessel at a point intermediate its apex and the circular surface whereby the vessel can be moored.

4. A floating station for mooring flying boats and other aircraft adapted to descend on and take off from water, comprising, a conical buoyant vessel adapted to float with its apex arranged downwardly and with its circular surface upwardly, a turnable deck extending across the circular surface of said vessel, from which deck the aircraft may be handled and to which it may be moored, whereby the aircraft can swing with change of wind and current without turning the conical vessel, and a hawse pipe extending from the conical side of said vessel at a point intermediate its apex and the circular surface whereby said vessel can be moored.

5. A floating station for mooring flying boats and other aircraft adapted to descend on and take off from water, comprising a conical buoyant vessel adapted to float with its apex downwardly and with its circular surface upwardly, a central hollow trunk on the circular surface of said vessel, tanks in said vessel having union pipes extending through said trunk, a hawse pipe extending through said conical vessel from the hollow trunk to the conical side of said vessel at a point intermediate its apex and the circular surface, and a deck extending across the circular surface of said vessel mounted to turn about said central hollow trunk, from which deck the aircraft may be handled and to which it may be moored, whereby the aircraft can swing with change of wind and current without turning the conical vessel.

In witness whereof I have hereunto set my hand.

ALAN JOHN COBHAM.